United States Patent
Bortnik et al.

(10) Patent No.: US 7,841,517 B2
(45) Date of Patent: Nov. 30, 2010

(54) VISUAL IDENTITY MECHANISMS

(75) Inventors: Michal Bortnik, Seattle, WA (US);
Henry Paul Morgan, Redmond, WA (US); Steven Dale Lamb, Seattle, WA (US); Vincent H. Curley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 115 days.

(21) Appl. No.: 11/331,542

(22) Filed: Jan. 13, 2006

(65) Prior Publication Data

US 2007/0164100 A1 Jul. 19, 2007

(51) Int. Cl.
G06K 5/00 (2006.01)
G06K 7/01 (2006.01)
G06F 7/08 (2006.01)
G06F 17/00 (2006.01)
G06F 19/00 (2006.01)
A63F 9/24 (2006.01)
A63F 13/00 (2006.01)

(52) U.S. Cl. .................... 235/380; 235/381; 235/382.5; 463/30; 463/41; 463/43

(58) Field of Classification Search ................. 235/380, 235/381, 382.5; 902/4, 5; 709/205; 463/29–33, 463/40–43; 345/533, 960
See application file for complete search history.

(56) References Cited

U.S. PATENT DOCUMENTS

| 5,553,864 | A | * | 9/1996 | Sitrick | 463/31 |
|---|---|---|---|---|---|
| 6,142,876 | A | * | 11/2000 | Cumbers | 463/25 |
| 6,234,900 | B1 | * | 5/2001 | Cumbers | 463/29 |
| 6,641,481 | B1 | * | 11/2003 | Mai et al. | 463/42 |
| 7,048,630 | B2 | * | 5/2006 | Berg et al. | 463/30 |
| 7,240,093 | B1 | * | 7/2007 | Danieli et al. | 709/205 |
| 2002/0142825 | A1 | * | 10/2002 | Lark et al. | 463/16 |
| 2002/0160838 | A1 | * | 10/2002 | Kim | 463/42 |
| 2004/0049647 | A1 | * | 3/2004 | Moon | 711/164 |
| 2004/0235558 | A1 | * | 11/2004 | Beaulieu et al. | 463/20 |
| 2005/0021159 | A1 | * | 1/2005 | Ogawa | 700/91 |
| 2005/0153762 | A1 | * | 7/2005 | Sterchi et al. | 463/3 |
| 2006/0035713 | A1 | * | 2/2006 | Cockerille et al. | 463/42 |
| 2006/0177109 | A1 | * | 8/2006 | Storch | 382/118 |
| 2006/0178216 | A1 | * | 8/2006 | Shea et al. | 463/42 |
| 2008/0076519 | A1 | * | 3/2008 | Chim | 463/20 |
| 2010/0007926 | A1 | * | 1/2010 | Imaizumi et al. | 358/434 |

* cited by examiner

*Primary Examiner*—Daniel Walsh
(74) *Attorney, Agent, or Firm*—Woodcock Washburn LLP

(57) ABSTRACT

Mechanisms for visual identification of a user in a gaming environment. For example, a digital image is used to identify a user, whether the user is on-line or off-line. This digital image is easily verifiable as an appropriate and non-offensive image because it May come form a controlled digital image source (or set of sources). The digital image is also revocable in a variety of gaming environment contexts by a gaming authority. Lastly, the digital image is changeable depending on the context of the gaming environment, in one aspect, being configured to be visible to the entire gaming environment in one form, and being visible to a subset of the gaming environment in another form.

20 Claims, 15 Drawing Sheets

VISUAL IDENTITY MECHANISMS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2005, Microsoft Corp.

FIELD OF THE INVENTION

The present invention relates to the field of computing, and more particularly, to gaming environments.

BACKGROUND

Gaming systems are prevalent in today's computing environments. On-line gaming, for example, has millions of users and is growing rapidly by the day. In gaming environments, identification of a user may be helpful in engaging the user with millions of other on-line users. One way to provide identification of such a user is via a visual identity, such as a digital image. This digital image, however, may be inappropriate or offensive in some contexts or gaming spaces. It would therefore be advantageous to provide mechanisms that allow for a visual identification of a gaming user in such a way as to assure that the identification of the user is appropriate to the context in which it appears.

SUMMARY

Mechanisms are provided that allow for visual identification of gaming users in, for example, on-line gaming environments. A digital image is provided that is easily verifiable as an appropriate image in virtue of being obtainable from known digital image sources, such as hard disks, flash memories, gaming discs, game console related websites, or from an approved marketplace. Such digital images can be revoked upon requests of a user. A gaming authority can revoke images based on some established threshold. To ensure that such digital images are appropriate, the digital image may have a context-dependent appearance. Thus, for example, in one context it may have a standard appearance to general users of a computing system, and a particularized appearance to other users of the gaming environment. In one aspect of the presently disclosed subject matter, the particularized appearance may be associated with a friends list of a user that uses the digital image.

It should be noted, that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION

Overview

Various aspects of visual identity mechanisms are disclosed. First, in FIGS. 1-4, various technological aspects are provided that focus on the how these mechanisms function and the results they accomplish. Second, based on these technological aspects, in FIGS. 5-13, an associated visual disclosure is provided that depicts the identity mechanisms in various windowed contexts. Lastly, in FIGS. 14-15, exemplary computing implementations and environments are discussed suitable for gaming environments in which the visual identity mechanisms can be used.

Technological Aspects of Visual Identity Mechanisms

Figure 1:
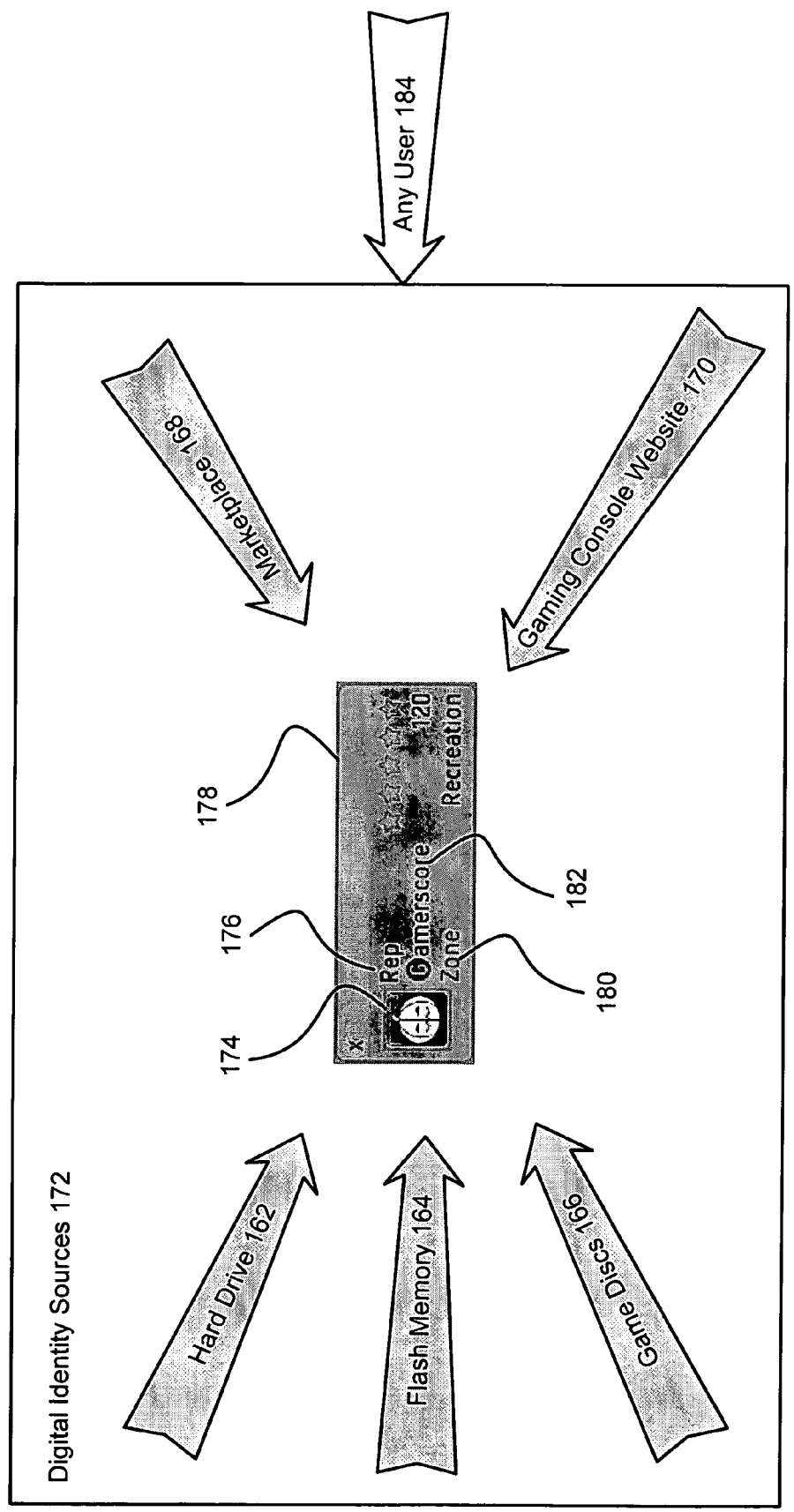
FIG. 1 illustrates a set of digital identity sources that are able to provide digital identities, such as digital images, for users in a gaming environment.

FIG. 1 illustrates a set of digital identity sources 172 that are able to provide digital identities for users in a gaming environment. One example of a digital identity may be a digital image 174. Thus, per FIG. 1, a hard drive 162 can provide digital images to a gamer card 178, where the gamer card (or simply put, digital card) 178 may contain a user's gaming information. Such gaming information may include the reputation 176 (or "Rep") of a gaming user, the user's score 182 in some game space, and the zone 180 in which the user acquired the score 182.

The digital image 174 may subsist on the gamer card 178 to further more accurately identify a user (and to provide visual information about the user to other users in the gaming environment). Interestingly, and as will be discussed in more detail below, the digital image 174 may be easily verifiable as a gaming environment image by examining the source from which it originated. Thus, for example, by knowing that the digital image 174 came from the hard drive 162, the digital image 174 can be assumed to contain certain desired characteristics, such as being non-offensive, not immature, and so on. If, however, the digital image 174 is somehow considered offensive or undesirable, it can be revoked by a gaming authority that is providing for or allowing for the gaming environment.

The hard drive 162 source can be interfaced with a gaming console which may participate in the gaming environment. Similarly, the flash memory 164 source may be part of the internal memory of the gaming console. In other words, a gaming console can contain a plurality of digital images, such as the digital image 174 depicted in FIG. 1. Alternatively, a game disc 166 can be another source of the digital image 174, where upon inputting the disc 166 in the console and playing a game, a user can download the digital image 174 from the disc 166 and arrange for the digital image 174 to correspond to the user. A plurality of images can be stored on such hard drives 162, flash memory 164 and/or game discs 166.

At least two other sources for the digital image 174 may include the marketplace 168 and a website 170 associated with the gaming console. In the former case, a user may obtain the digital image 174 from some vendor on the internet. To assure quality control, the vendor may be pre-approved by the gaming authority that is providing the gaming environment. In the latter case, the game console can communicate via the internet with some website 170 that is associated with the game console. By example only and not limitation, the Microsoft's Xbox can communicate with the Xbox.com website to download the digital image 174.

One especially interesting aspect of the present disclosure is that the digital image 174 is obtained from a limited source pool. Thus, any random user 184 can be prevented as being a source of the digital image 174. By limiting the sources of the digital image 174, assurances can be made that the digital image 174 will not contain some undesirable content which may be immature, pornographic, or offensive in other ways. However, these sources can be dynamically updateable, thus they can vary over time and across sources.

Figure 2:
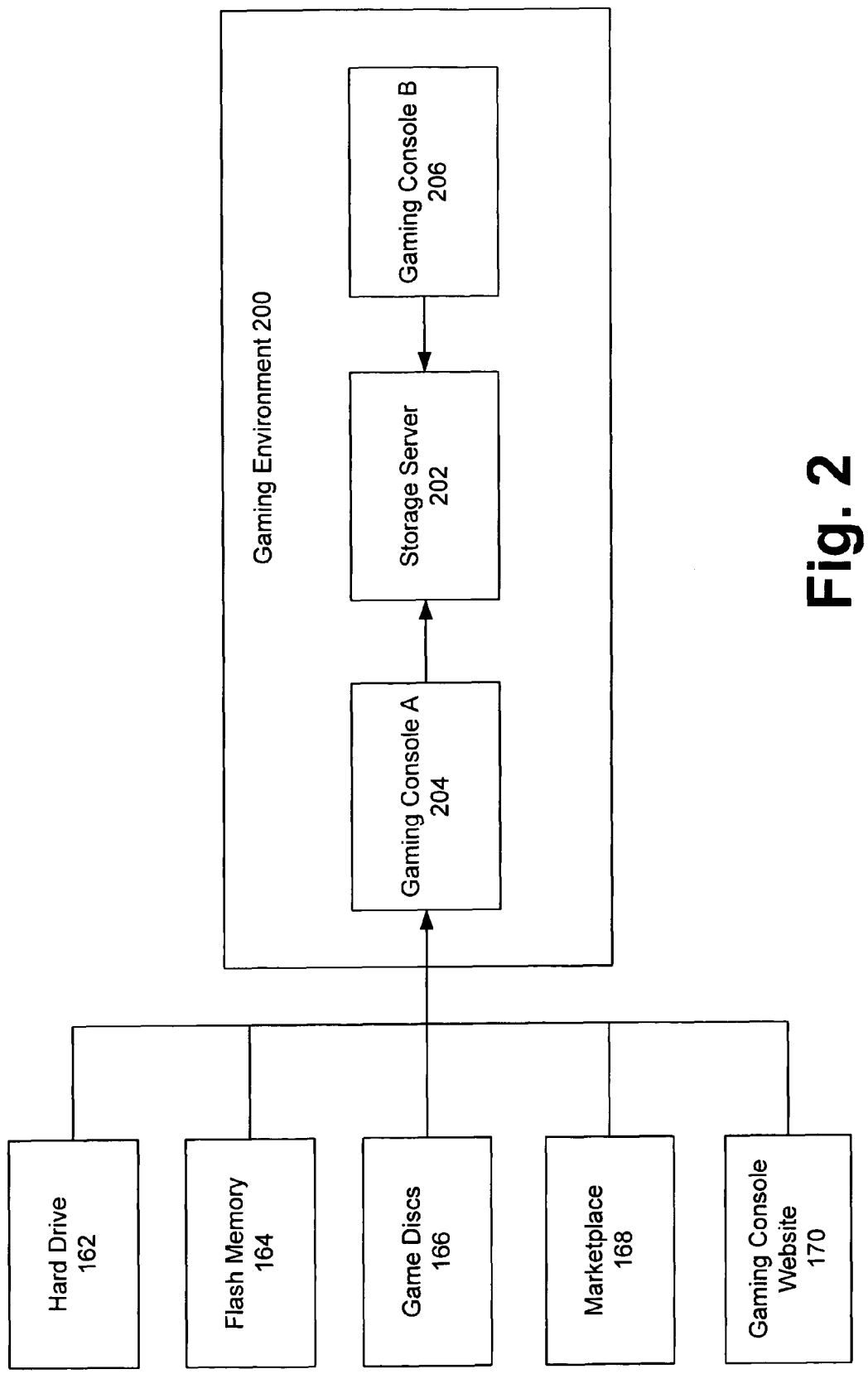
FIG. 2 illustrates how the sources of the digital image may provide the digital image to a gaming console and how this gaming console can communicate the digital image to other gaming consoles in some gaming environment.

FIG. 2 illustrates how the sources of the digital image may provide the digital image to a gaming console and how this gaming console can communicate the digital image to other gaming consoles in some gaming environment. Thus, as discussed per FIG. 1, at least five sources 162, 164, 166, 168, and 170 may provide a digital image to some gaming console, say, gaming console A 204 which may be operating in some gaming environment 200 such as, for example, Xbox Live. The digital image provided by any one the sources 162, 164, 166, 168, and 170 may then be stored on a storage server 202 so that another user on a different gaming console, say, console B 206, can access the digital image. The storage server 202 can be managed by some gaming authority or body that provides for, or is in charge of, setting up the gaming environment 200. The digital image can be distributed all over the gaming environment 200 to various game spaces and users who may be playing games in those spaces.

Figure 3:
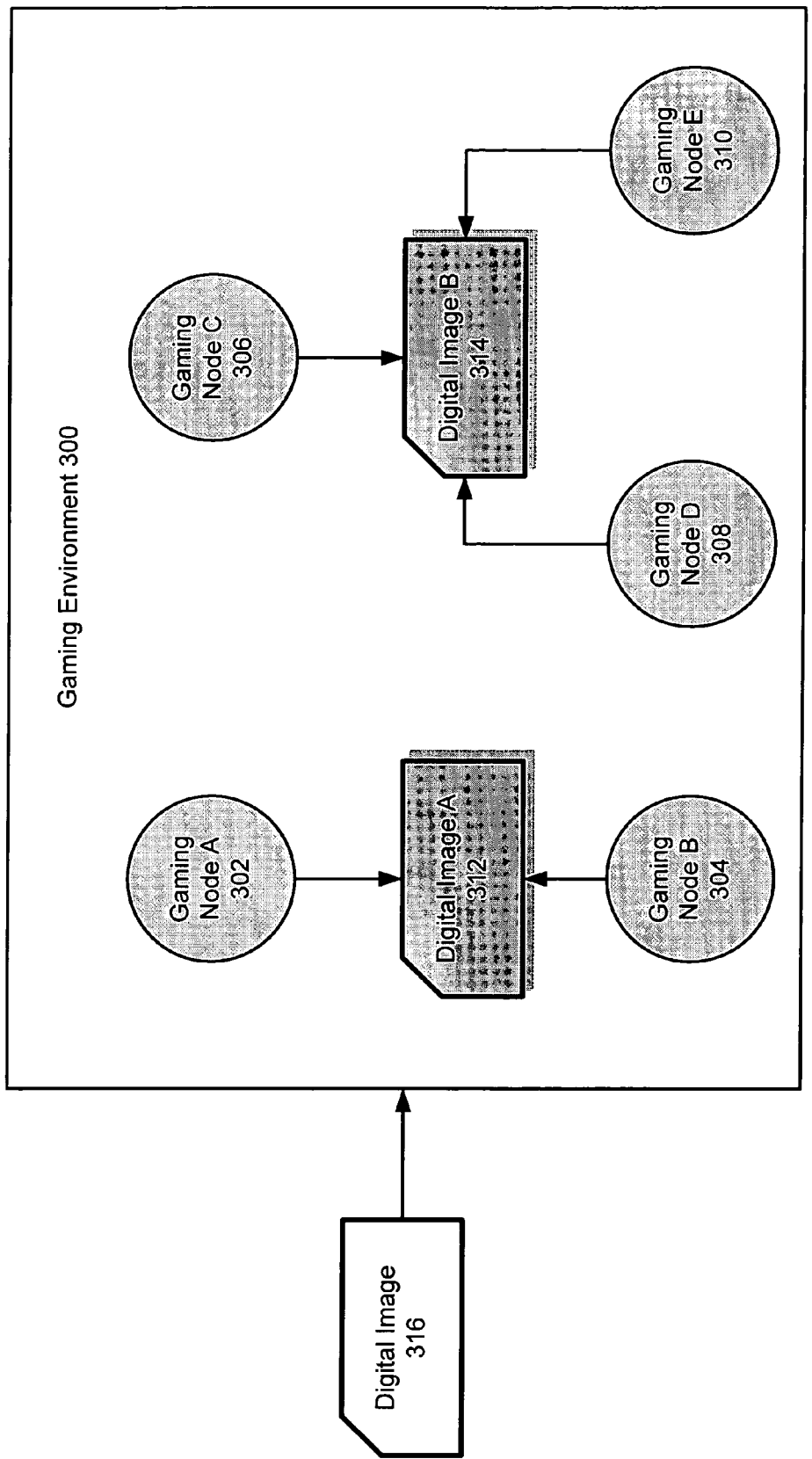
FIG. 3 illustrates that the digital image may have at least a dual nature, allowing for different visual representation in different gaming environment contexts.

Next, FIG. 3 illustrates that the digital image may have at least a dual nature. Thus, a digital image 316 may appear in one context as digital image A 312 and in another context as digital image B 314. To users in gaming node A 302 and gaming node B 304 (where a gaming node may be any set of users in some game space), the digital image 316 may appear to be digital image A 312. However, to users in gaming nodes C, D, and E, 306, 308, and 310, respectively, the digital image 316 may appear as digital image B 314. This dual nature of the digital image 316 allows it to, for example, appear as a non-offensive image to users in nodes A 302 and B 304, while being particularized as something else, whether offensive or not, to users in nodes C 306, D 308, and E 310.

Thus, in one aspect of the presently disclosed subject matter, to users in nodes A 302 and B 304, the digital image can be a standard image provided by any of the digital image sources discussed above with reference to FIGS. 1 and 2, while to users in nodes C 306, D 308, and E 310, it can be a particularized image to the users that are on each others' friends list (more on the friends list is provided below). Particularized images can entail a selection of a particular image, any manipulation thereof, or creation thereof, while standard images can entail those images provided by a source or some subset thereof—a subset that is deemed non-offensive to general gaming environment users.

Yet, in another aspect of the presently disclosed subject matter, in addition to the mechanism described above, which allows each player to make a judgment about what is appropriate to be shared with players on a friends list, another mechanism can be used that allows friends of a player (or the friends' parents) to decide whether they want to "trust" that player's judgment. Specifically, it may be possible to change a privacy setting (or a family setting, if the action is executed by a parent on behalf of a child) so that the standard (not the particularized) digital image is always displayed for that player. This aspect minimizes the potential for exposure of offensive content to highly-sensitive people (even in a circle of friends).

Figure 4:
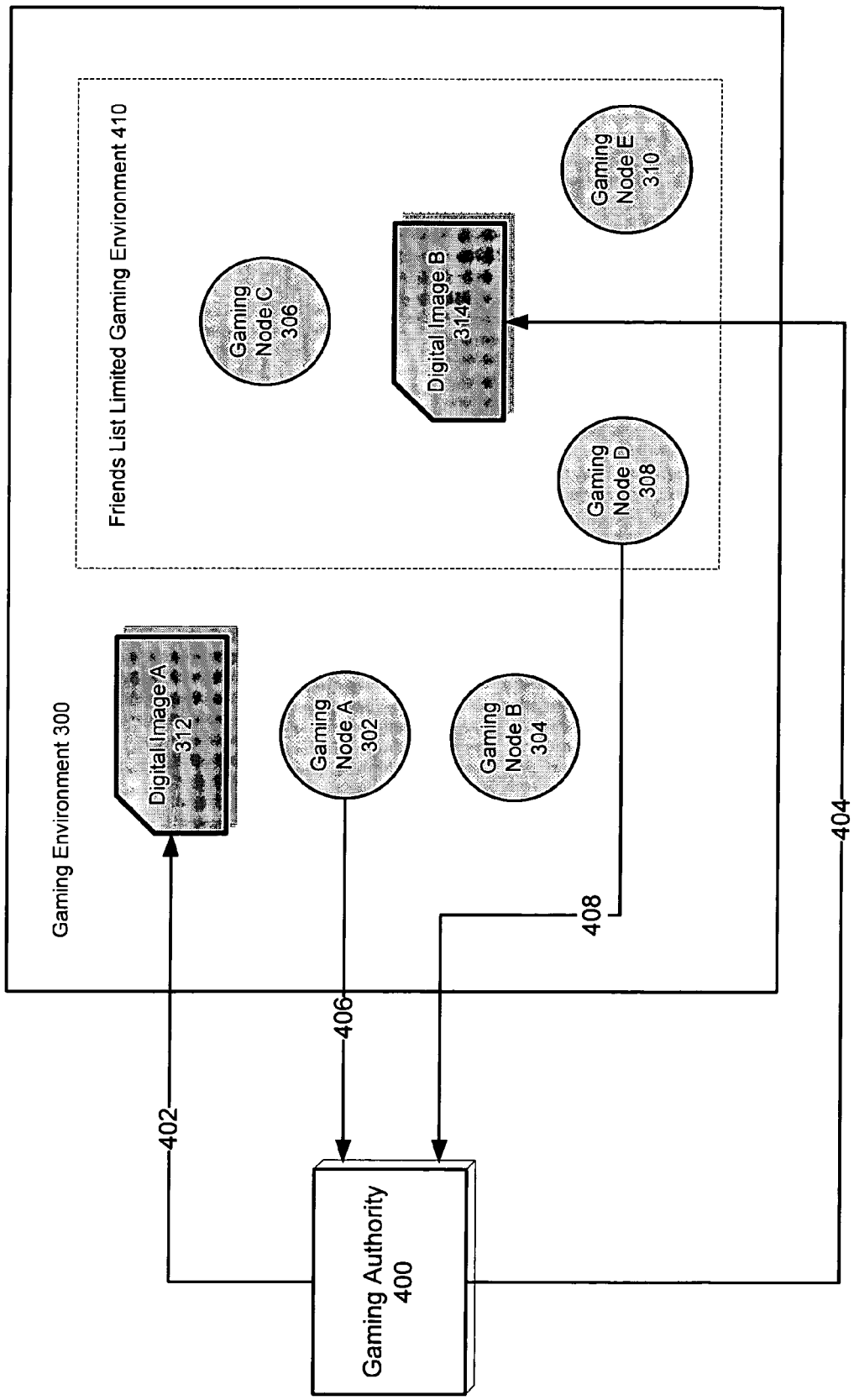
FIG. 4 illustrates what happens when a digital image is considered offensive or undesirable, and how it can be reported to a gaming authority and then potentially removed from the gaming environment.

FIG. 4 thus illustrates what happens when a digital image is considered offensive or undesirable, and how it can be reported to a gaming authority and then potentially removed from the gaming environment. Some gaming authority 400, such as a company providing the gaming environment 300, can receive input from users in gaming nodes. Users in gaming node A 302 or users in a friends list limited gaming environment 410, such as users in gaming node D 308, can report 406 and 408, respectively, to the gaming authority 400 that some content of a digital image is undesirable. The gaming authority 400 can then take some action, such as removing 402 and 404, respectively, a digital image for a user who has used the undesirable content. The removal of a digital image from a gaming environment can be done pursuant to some threshold, such as a ratings system or judgment of the gaming environment administrator.

In one aspect of the presently disclosed subject matter, the gaming authority 400 may only wish to remove digital images based on requests made from the general gaming environment 300 users in nodes A 302 and B 304, and not those in the friends list limited gaming environment 410—allowing users who are friends to self-regulate. Yet, a threshold for removal can be established even if friends are posting offensive content. Alternatively, friends can remove themselves from a friends list by unilateral action or, as mentioned above, they can preemptively protect themselves from offensive exposure to a particularized content by having a standard digital image appear for a particular player (who may also be on the friends list).

Visual Aspects of Identity Mechanisms

Figure 5:
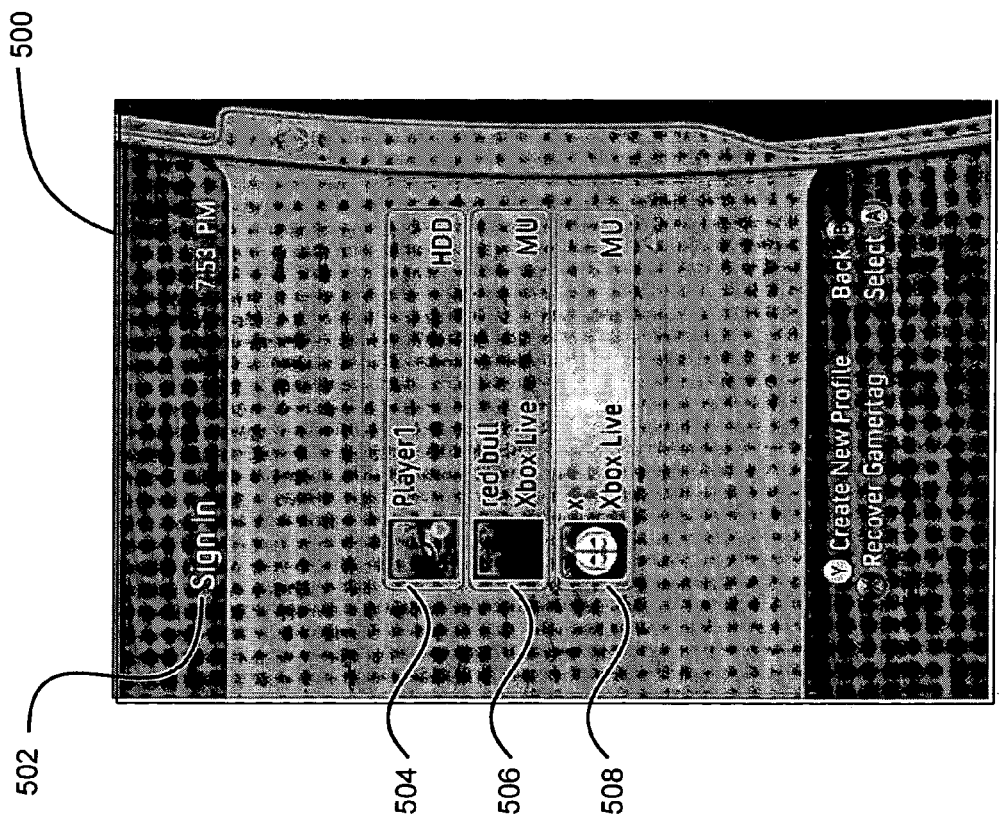
FIG. 5 illustrates what happens when the gaming environment users first log-on to a gaming console and how they can identify different players by their digital images.

The visual aspects of the presently disclosed subject matter are a result of (and therefore tied to) the technological aspects discussed above. Thus, FIG. 5 illustrates what happens when the gaming environment users first log-on to a gaming console. At sign-in 502, an interface 500 may expose various user accounts with appended digital images 504, 506, and 508. Each digital image may correspond to a different gaming console user or player. In the illustrated interface 500, a "Player 1" can be selected, and this "Player 1" has its own digital image 504. Likewise, the other players, such as "red bull" and "x" have their own digital images 506 and 508, respectively. Each player may have a different digital image than another player, or the same image. This much may be player determined.

Figure 6:
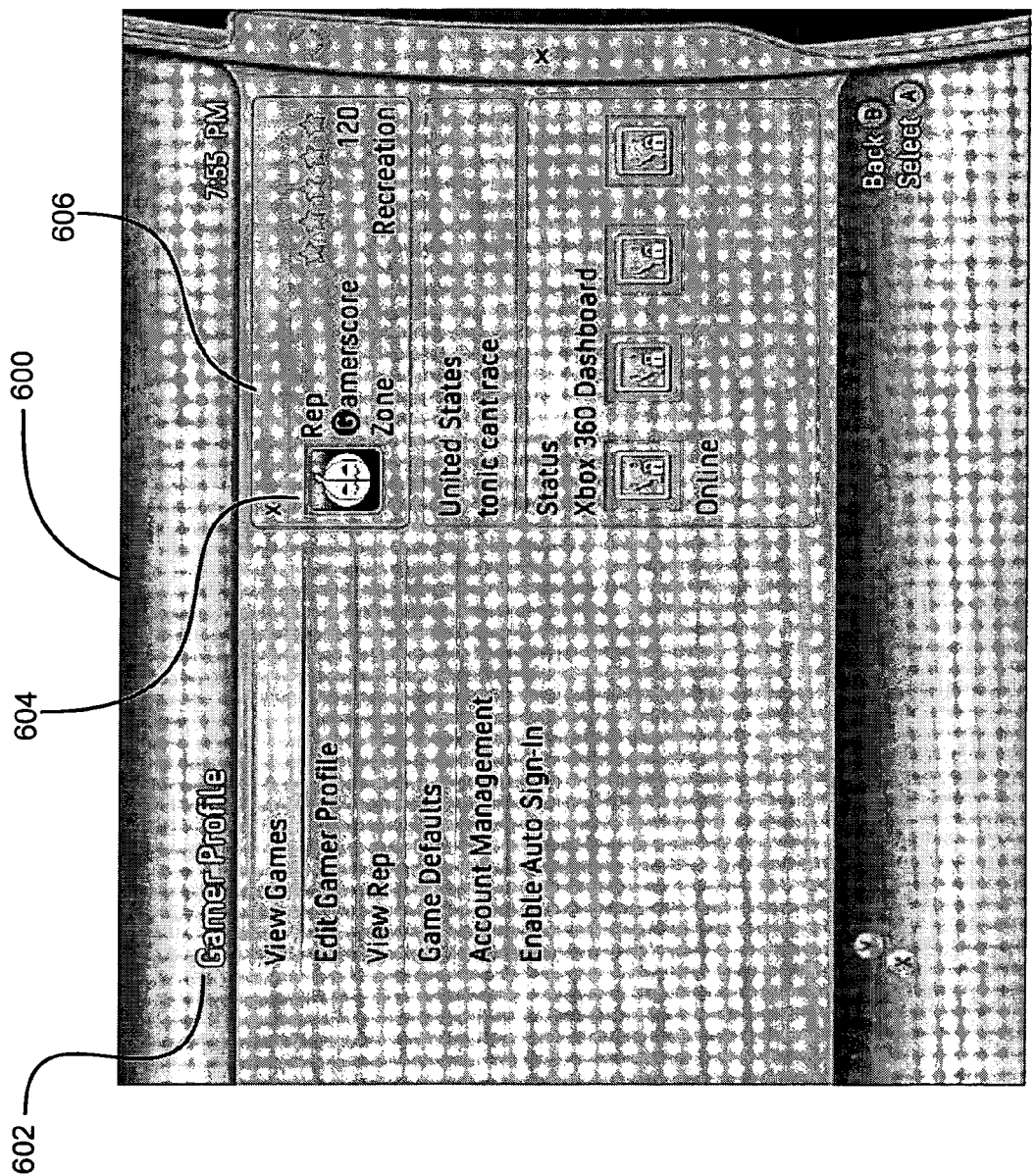
FIG. 6 illustrates one type of gamer profile interface, in contrast to the gamer profile interface of FIG. 7, where in both interfaces digital images can identify a gaming environment user.

Upon signing-in and selecting a player, another interface 600 provides a gamer profile 602. FIG. 6 therefore illustrates how the digital image 604 fits in with the rest of the gamer profile 602, in particular how it fits in with a digital gamer card 606. Thus, in this aspect of the invention, the digital image 604 allows for easy identification of the user by the user (but it also allows for easy identification of the user by other users, as discussed with reference to FIG. 2). The digital image 604 then, provides additional identification information—in addition to the player or gamer reputation, the game score, the zone in which the player is playing.

Figure 7:
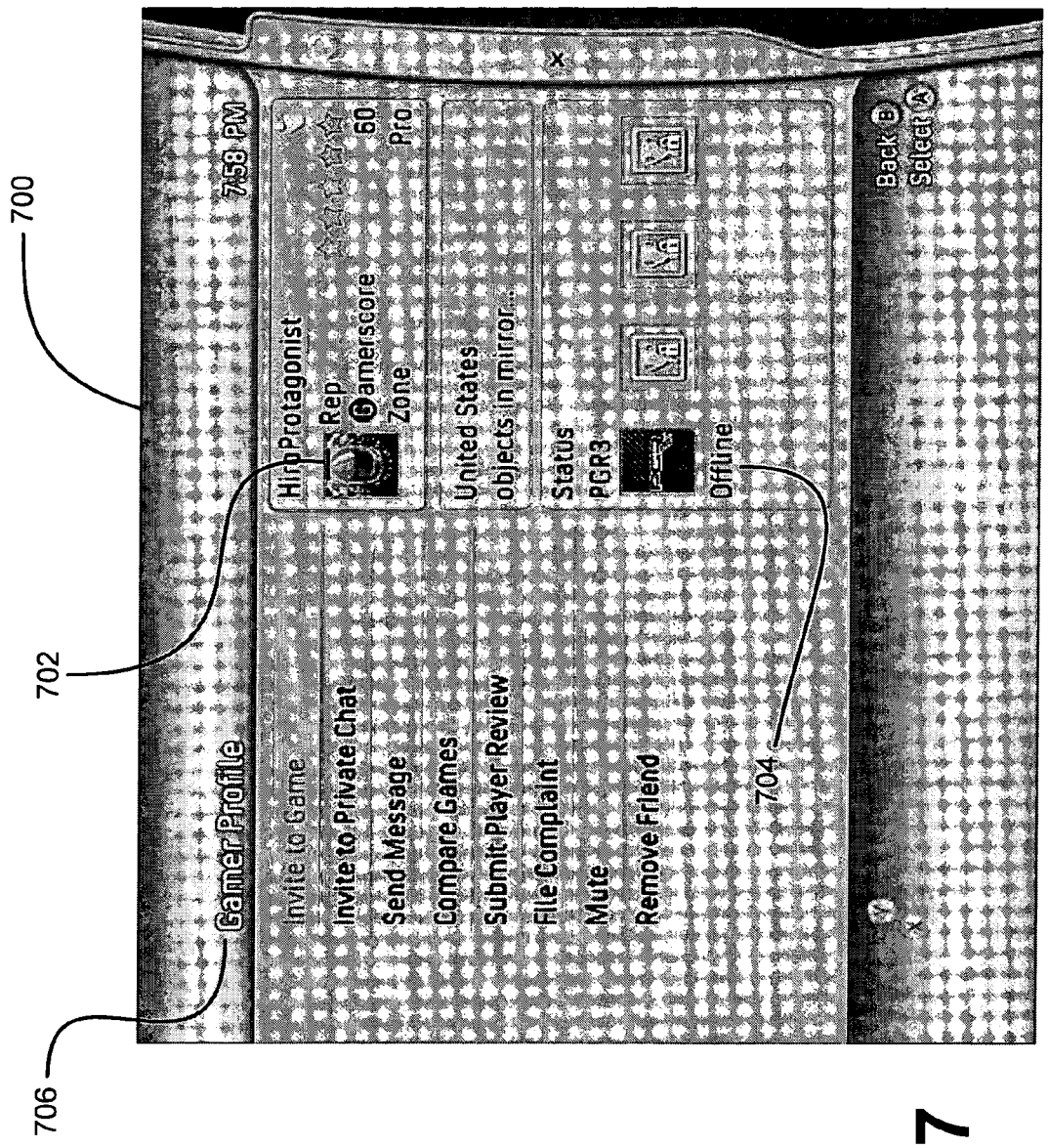
FIG. 7 illustrates another type of gamer profile interface, in contrast to the gamer profile interface of FIG. 6.

Next, FIG. 7 illustrates another gamer profile to the gamer profile illustrated in FIG. 6. Here, as in FIG. 6, the digital image 702 subsists on some gamer card. The gamer profile, shown as screen interface 700, can contain various other selections then those that were present in FIG. 6. For example, whereas in this interface 700 a user can invite another user to a game ("Invite to Game"), in FIG. 6 this option was not present. One reason these gamer profile interfaces 600 and 700 differ is that the former is configured for personal user account management, whereas the latter is used to interact with other users. The point here being, that a digital image can be represented in a plurality of gamer profiles, whether 602 or 706.

Figure 8:
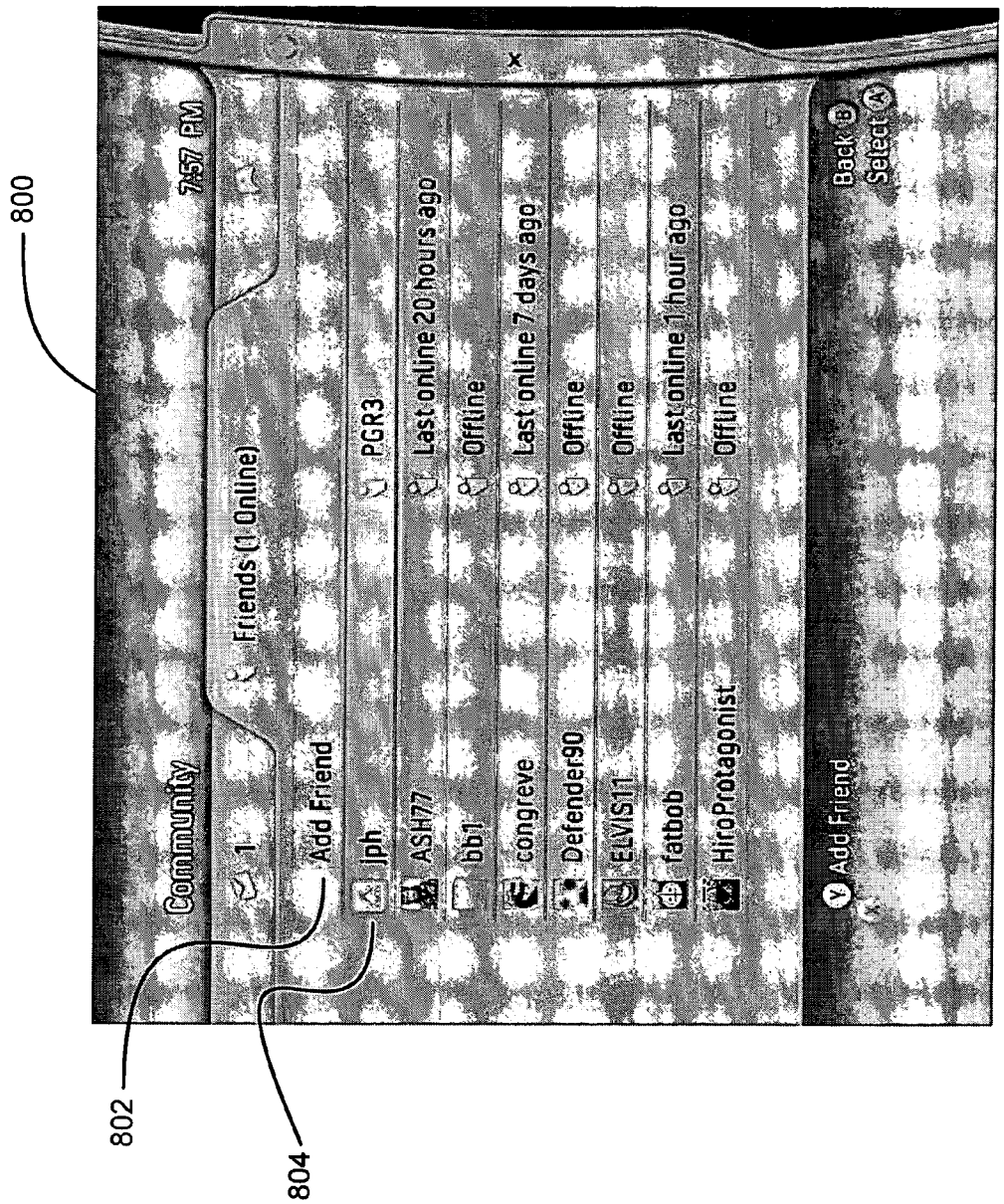
FIG. 8 illustrates that a digital image can be used to quickly identify other users on a community of users interface, whether those other users are friends (such as those that are on a friends list) or just some arbitrary gaming community users.

FIG. 8 illustrates that a digital image can be used to quickly identify other users on a community of users interface 800, whether those other users are friends (such as those that are on a friends list) or just some arbitrary gaming community users. In FIG. 8 there happen to be eight such friends listed, one of whom is online, namely, "jph" which happens to have an "Xbox" digital image 804. Digital images such as those used by "jph" allow a user of the interface 800 to quickly identify the "jph" user. This may be especially helpful when the list of friends is large, such as a list containing hundreds of friends (or general gaming environment users). Notably, friends can be added 802 to the list, and such addition may require the consent of the friend being asked to joint the list of friends.

Figure 9:
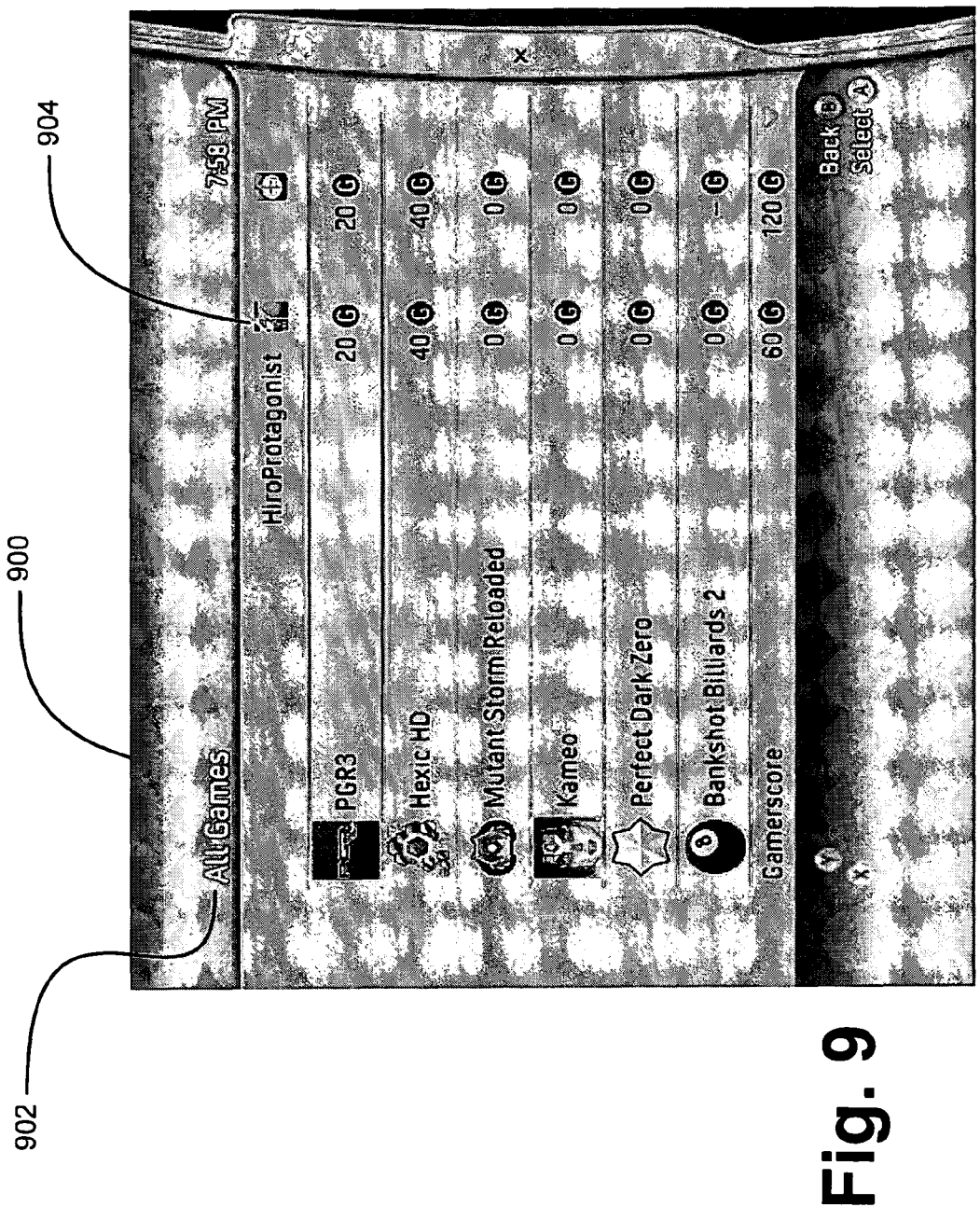
FIG. 9 illustrates an all games interface that shows all the games that were played by users, where the users can be identified by digital images.

FIG. 9 illustrates an all games interface 900 that shows all the games 902 that were played by users, where the users can be identified by digital images. Users can inspect game scores by examining digital images. For example, in the first column on the left of the interface 900, the "HiroProtagonist" has amassed a score of 20 in "PGR3", a score of 40 in "Hexic HD", a score of 0 in "Kameo", and so on. The "Hiro-Protagonist" can be readily identified by its digital image 904. Interestingly enough, the games themselves may also be identified by digital images.

Figure 10:
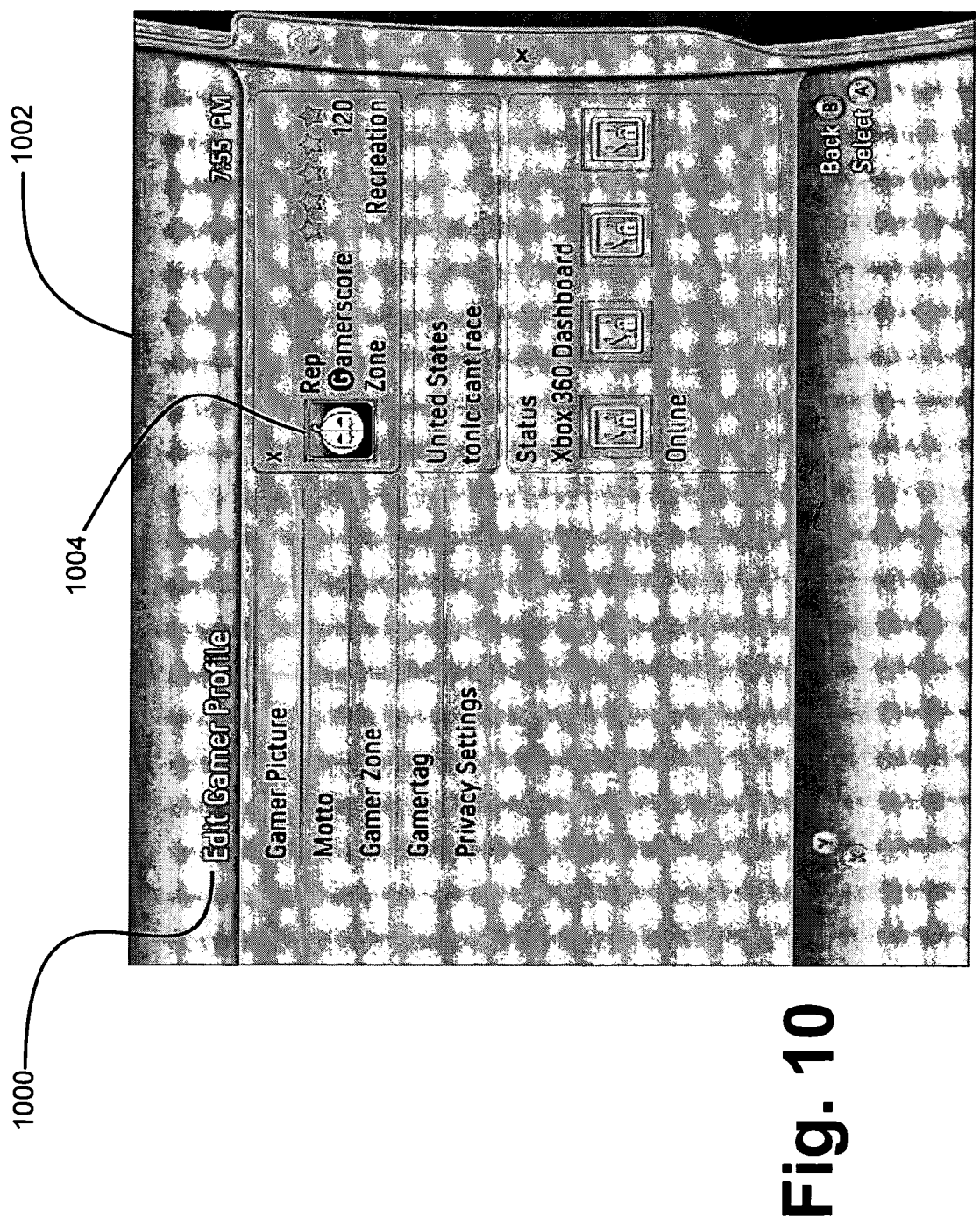
FIG. 10 illustrates that a gamer profile of a user can be edited, which allows for the eventual editing of digital images.

FIG. 10 illustrates that a gamer profile of a user can be edited 1000, which allows for the eventual editing of digital images 1004. In the edit interface 1002 may allow for not only the editing of the "Gamer Picture", which may correspond to the digital image 1004, but also other gaming information. For example, the "Motto" of the user can be edited, along with the "Gamer Zone", the "Gamertag", and "Privacy Settings".

Figure 11:
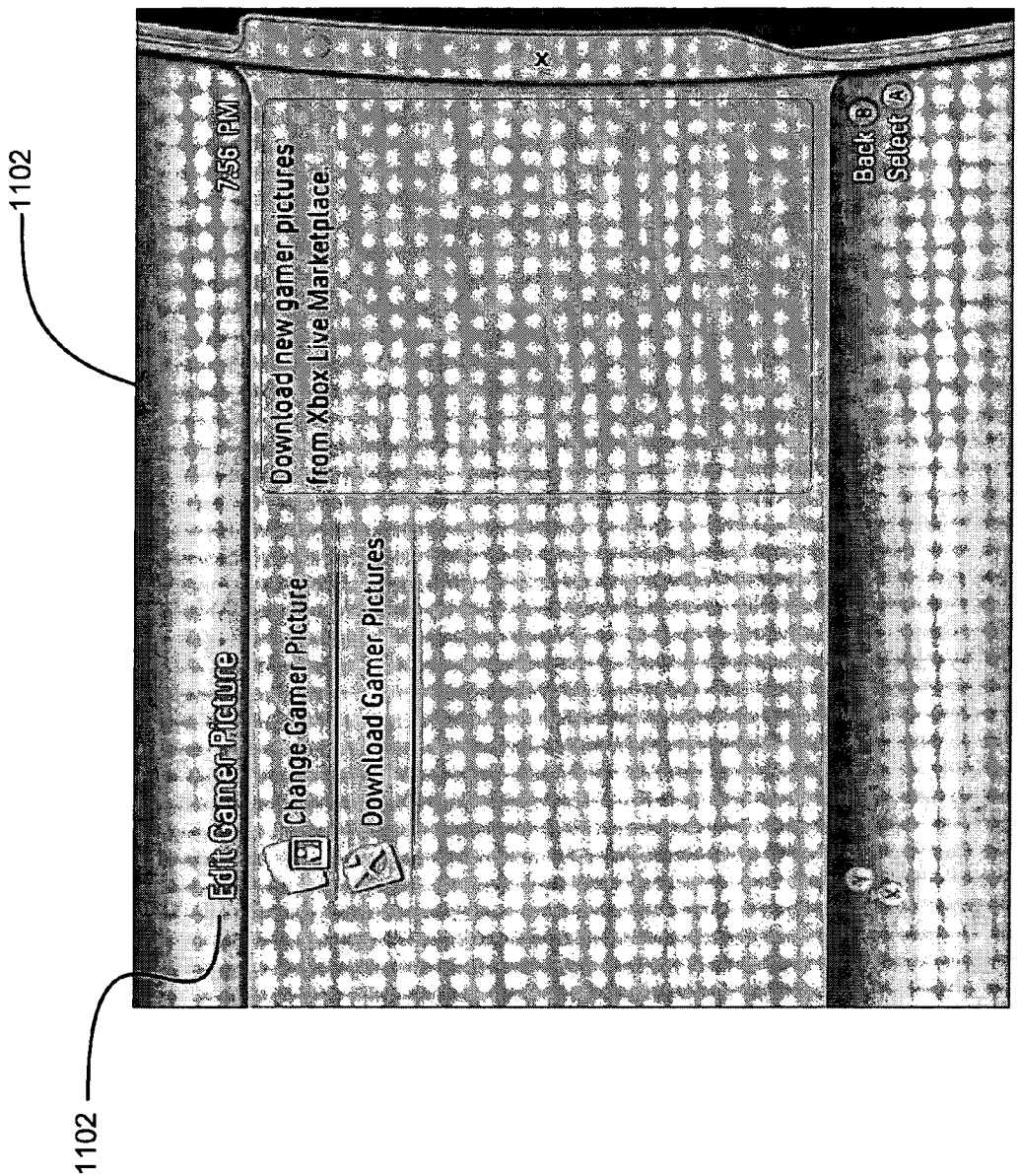
FIG. 11 illustrates that when a digital image is being edited, several options for obtaining a new digital image may be presented.

FIG. 11 illustrates that when a digital image is being edited, several options for obtaining a new digital image may be presented. For example, a current digital image may be changed to a new digital image that may be stored on a gaming console's flash memory, hard drive, or a game disc. In this scenario, a user could select the "Change Gamer Picture". Alternatively, if the new digital image in not present in any of these sources, it may be downloaded using the "Download Gamer Pictures" option. Using this option, a user can download digital images either from the marketplace, where digital images may be sold by third party vendors, or from a website that is associated with the gaming console. These, of course, are merely exemplary digital image changing option, and those skilled in the art can readily appreciate that other options may be used as well.

Figure 12:
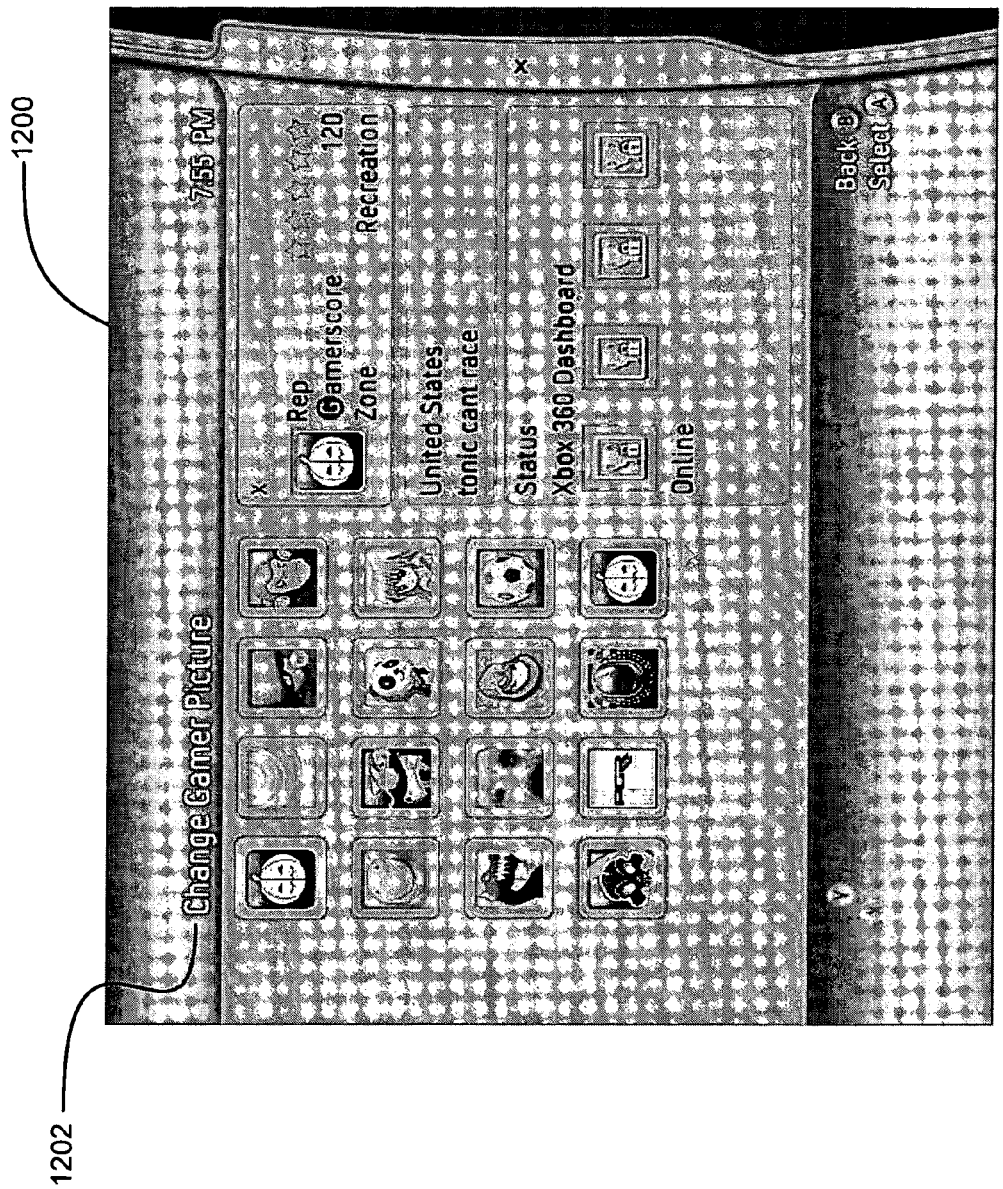
FIG. 12 illustrates a sampling of the types of digital images that may be obtainable by a user wishing to change his digital image identifier.

Whether digital images are obtained locally from a hard drive, flash memory, or a game disc, or remotely from a vendor or a game console related website, numerous choices are available for new digital images. Thus, FIG. 12 illustrates a sampling of the types of digital images that may be obtainable by a user wishing to change his digital image identifier. Sixteen digital images are depicted in FIG. 12, the list of images can be vastly more extensive, limited only by the user's willingness to acquire more digital images. In one aspect of the presently disclosed subject matter, a user can obtain digital images upon winning a game or after surpassing a level or threshold in a game. Thus, particular images to certain games, or website, or vendors, and so on, can also be made available to the user.

Figure 13:
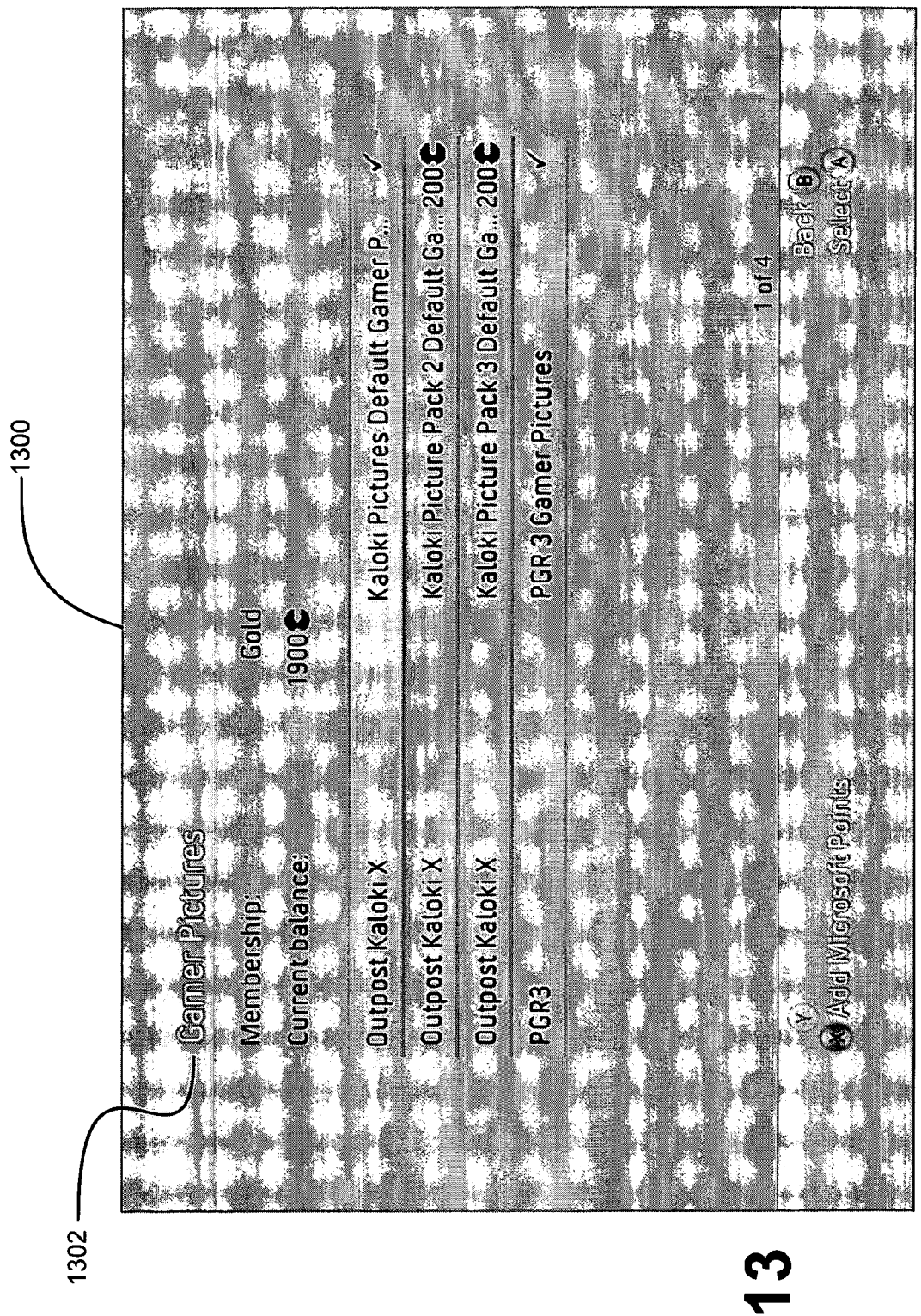
FIG. 13 illustrates the idea that digital images can be purchased by users with virtual currency acquired in the gaming environment.

Lastly, FIG. 13 illustrates the idea that digital images can be purchased by users with virtual currency acquired in the gaming environment. For example, if a user amasses enough points in a game, that user may use these points as a means to buy sought-after digital images—that may or may not be obtainable otherwise. Thus, digital images can be purchased either using such virtual currency or actual currency, if for example, vendors have such digital images for sale. In the illustrated interface 1300, "Gamer Pictures" 1302 or digital images can be purchased using the amassed "Gold" currency, which, in FIG. 13 is depicted as being 1300. Various prices can be set for individual digital images. For instance, the more sought-after a digital image is, the more it can cost. Various other currency-for-digital-image regimes can be used, as those of skill in the art will appreciate.

The visual aspects of the presently disclosed subject matter are merely exemplary and not limiting. They are shown here merely for illustrative purposes, to suggest how the technological aspects discussed with reference to FIGS. 1-4 can be surfaced in a visual form.

Exemplary Computing Implementations and Environments

Figure 14:
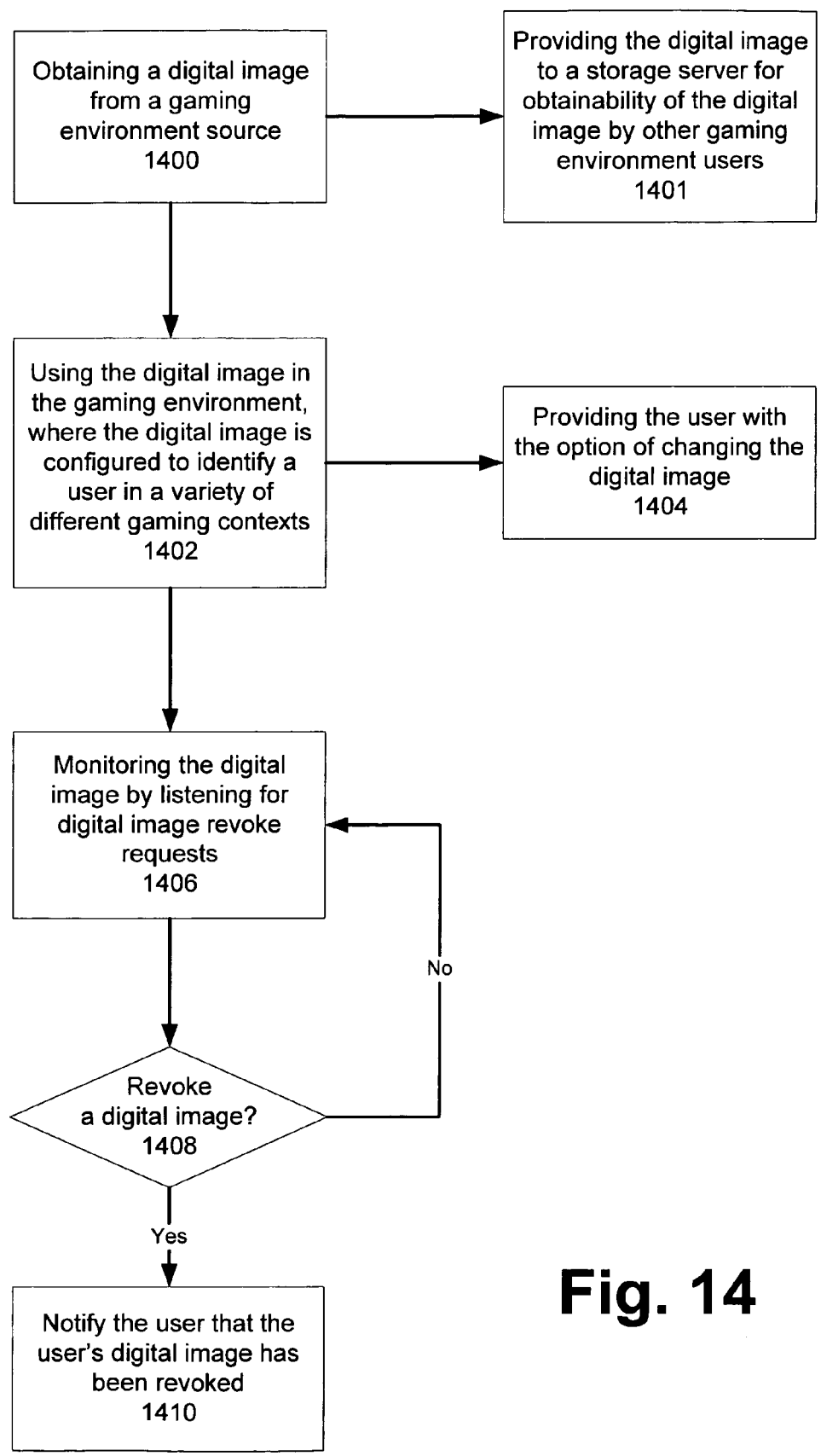
FIG. 14 illustrates in block diagram form an exemplary implementation of the various aspects disclosed above.

FIG. 14 illustrates in block diagram form an exemplary implementation of the various aspects disclosed above. Specifically, at block 1400 a digital image is obtained from some digital image source, which may be a closed system source, thereby ensuring that the content of the digital image is reliable, desirable, and non-offensive to users of the gaming environment. As mentioned above already, one type of such source may be a hard drive that can interface with a gaming console used in the gaming environment. Another may be the internal flash memory of the gaming console. Still other sources can include a game disc or cartridge used by the gaming console, a gaming console related website, or even a vendor marketplace website where digital image can being be downloaded for free or purchased.

In any case, once the digital image is obtained, at block 1401 it can be provided to a storage server so that other users in the gaming environment have access to the digital image—in the sense that they can see that the user with the corresponding digital image is on-line or not. In an off-line scenario, this step could be omitted.

At block 1402, the digital image may be used in the gaming environment. As it is being used, it can be configured to identify a user in a variety of different gaming contexts. As discussed above already, the digital image can have one type of representation in the general gaming environment, so that it appears as a standard, non-offensive digital image, and it can have another type of representation in a more limited (or more extensive, for that matter) environment. This digital image in this latter type of environment may be configurable (personalizable) by the user to depict whatever content the user wants, as long as the user's circle of friends on the user's friends list is content with the content of the digital image.

As the digital image is being used, at block 1404, a gaming console may also provide the option of changing the digital image to another digital image. As was already discussed with reference to FIGS. 10-12, there are various ways and various sources for changing a digital image, whether by accessing local resources such as a hard drive or remote resources such as a gaming console related website.

Moreover, as the digital image is being used in the gaming environment, at block 1406, a gaming authority can monitor the content of the digital image by listening to any revocation or complaint requests that are made by the gaming environment users. A request can not only be made to revoke a digital image but to file a complaint about another user, which may in the future be used as a basis for revocation.

At step 1408, a gaming authority can make a determination of whether or not to revoke a user's digital image. Such as determination may be made based on some threshold standard, whether a ratings system or a standard established by the gaming authority itself. Also, the determination may vary, depending on whether the user making the request is a general gaming computing user or a friend on another user's friends list.

If a request for revocation is granted, then at block 1410, the gaming authority can notify the user that the user's digital image has been revoked—in case a user may be wondering why the user can't use that digital image anymore. Of course, various mechanisms can be set-up by the gaming authority for appeal by the revoked user. Also, perhaps the gaming authority may also provide information as to which user requested the revocation.

If, however, the revocation at block 1408 is not made, then the monitoring gaming authority can return back to the monitoring state at block 1406. The blocks illustrated in FIG. 14 are merely exemplary and not limiting. Various other aspects could be added in addition to these blocks, as discussed above.

Figure 15:
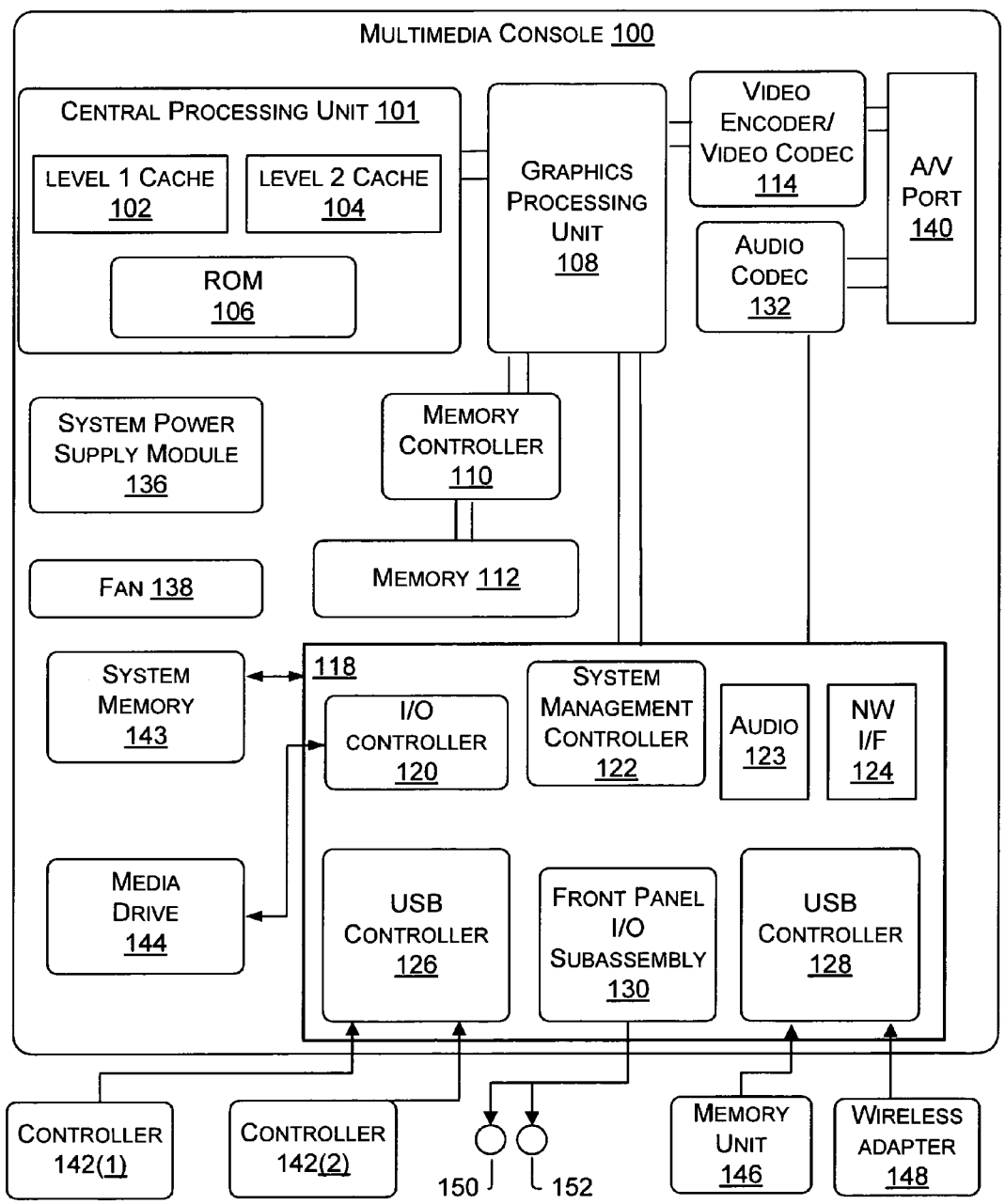
FIG. 15 illustrates in block diagram form an exemplary multimedia console that may be used in association with the gaming environment discussed above.

Referring next to FIG. 15, a block diagram shows an exemplary multimedia console that may be used in association with the gaming environment discussed above. For example, digital audio processing may be implemented in the multimedia console 100 of FIG. 15. The multimedia console 100 has a central processing unit (CPU) 101 having a level 1 (L1) cache 102, a level 2 (L2) cache 104, and a flash ROM (Read-only Memory) 106. The level 1 cache 102 and level 2 cache 104 temporarily store data and hence reduce the number of memory access cycles, thereby improving processing speed and throughput. The flash ROM 106 may store executable code that is loaded during an initial phase of a boot process when the multimedia console 100 is powered. Alternatively, the executable code that is loaded during the initial boot phase may be stored in a FLASH memory device (not shown). Further, ROM 106 may be located separate from CPU 101.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 and CPU 101 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory unit 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity, 3D, surround, and stereo audio processing according to aspects of the present invention described above. Audio data is carried between the audio processing unit 123 and the audio codec 126 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on or rebooted, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 may allow one or more users to interact with the system, watch movies, listen to music, and the like. However, with the integration of broadband connectivity made available through the network interface 124 or the wireless adapter 148, the multimedia console 100 may further be operated as a participant in a larger network community.

Finally, it should also be noted that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium, where, when the program code is loaded into and executed by a machine, such as a computer, the machine becomes an apparatus for practicing the subject matter.

In the case of program code execution on programmable computers, the computing device may generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, a visual identity mechanism was disclosed. However, other equivalent mechanisms to these described aspects are also contemplated by the teachings herein. Therefore, the present disclosure should not be limited to any single aspect, but rather construed in breadth and scope in accordance with the appended claims.

The invention claimed is:

1. A system for identifying a user in a gaming environment, the system comprising:
    a digital card for storing the user's gaming information; and
    a user-customizable digital image stored on the digital card, wherein the digital image is verifiable as a gaming environment image by examining a set of digital image sources,
    wherein the digital image visually distinguishes the user from all other users in the gaming environment;
    wherein the digital image is revocable from the gaming environment by a gaming authority that is providing the gaming environment to ensure the digital image is appropriate for users in the gaming environment,
    wherein the digital image is configured to correspond to at least two contexts of the gaming environment,
    wherein the digital image has at least a dual nature and is configured to have a first appearance in a first context of the at least two contexts and a second appearance in a second context of the at least two contexts, and
    wherein the first context corresponds to a first set of users and the second context corresponds to a second set of users.

2. The system according to claim 1, wherein the first appearance is determined by another user of the gaming environment who arranges for the user's digital image to have the first appearance to the another user.

3. The system according to claim 1, wherein one of the at least two contexts is a subset of the gaming environment, and wherein the subset of the gaming environment is associated with a friends list of the user.

4. The system according to claim 1, wherein the set of digital image sources includes a hard drive.

5. The system according to claim 1, wherein the set of digital image sources includes a flash memory.

6. The system according to claim 1, wherein the set of digital image sources includes a marketplace site.

7. The system according to claim 1, wherein the set of digital image sources includes a gaming console related website.

8. The system according to claim 1, wherein the set of digital image sources includes a game device such as a game disc.

9. The system according to claim 1, wherein the digital image is configured to be updated dynamically.

10. The system according to claim 1, wherein the revocability of the digital image by the gaming authority is based on at least one of (a) information provided by another user in the gaming environment or (b) information provided by another user on the user's friends list.

11. A computer-implemented method for identifying a user in a gaming environment, the computer-implemented method comprising:
    providing a user-customizable digital image that is verifiable as a gaming environment image by examining a digital image source, wherein the digital image visually distinguishes the user from all other users in the gaming environment, and wherein the digital image is revocable from the gaming environment by a gaming authority that is providing the gaming environment to ensure that the digital image is appropriate for users in the gaming environment; and
    configuring the digital image to correspond to at least two contexts of the gaming environment, wherein the digital image has at least a dual nature and is configured to have a first appearance in a first context of the at least two contexts and a second appearance in a second context of the at least two contexts, and wherein the first context corresponds to a first set of users and the second context corresponds to a second set of users.

12. The computer-implemented method according to claim 11, further comprising obtaining the digital image from the digital image source, wherein the digital image source comprises at least one of a hard drive, a flash memory, a game disc, a marketplace site, or a gaming console related web site.

13. The computer-implemented method according to claim 11, further comprising providing the digital image to a storage server, wherein the digital image is obtainable from the storage server by another user of the gaming environment.

14. The computer-implemented method according to claim 11, further comprising determining whether the digital image should be revoked based on a threshold associated with a ratings system.

15. The computer-implemented method according to claim 11, further comprising revoking the digital image upon a request from another user.

16. The computer-implemented method according to claim 11, further comprising providing for a substitution of the digital image for another digital image obtained from the digital image source.

17. A recordable tangible computer readable medium comprising a tangible physical article having computer-executable instructions for identifying a user in a gaming environment, the computer-executable instructions including instructions for:

using a user-customizable digital image in a gaming environment, wherein the digital image is verifiable as a gaming environment image by examining a digital image source, wherein the digital image visually distinguishes the user from all other users in the gaming environment, and wherein the digital image is revocable from the gaming environment by a gaming authority that is providing the gaming environment to ensure the digital image is appropriate for users in the gaming environment;

representing the digital image as a first visual representation in a first context of the gaming environment;

representing the digital image as a second visual representation in a second context of the gaming environment, wherein the first context corresponds to a first set of users and the second context corresponds to a second set of users; and revoking the digital image upon a request from another user of the gaming environment.

18. The recordable computer readable medium according to claim 17, wherein the computer-executable instructions further include instructions for revoking the digital image upon a threshold determination following the request.

19. The recordable computer readable medium according to claim 17, wherein the computer-executable instructions further include instructions for supplying the digital image to the gaming environment from a closed system source.

20. The recordable computer readable medium according to claim 17, wherein the computer-executable instructions further include instructions for providing for a substitution of the digital image for another digital image obtained from the digital image source.

* * * * *